United States Patent Office 3,187,026
Patented June 1, 1965

3,187,026
PREPARATION OF ACYLAMIDO-SUBSTITUTED ESTERS OF SULFURIC ACID
Donald L. Klass, Barrington, Ill., assignor to The Pure Oil Company, Chicago, Ill., a corporation of Ohio
No Drawing. Filed Dec. 7, 1961, Ser. No. 157,859
11 Claims. (Cl. 260—401)

This invention relates to new and useful improvements in processes for the production of acylamido-substituted esters of sulfuric acid, also known as carboxamido-substituted esters, and to novel products produced in accordance with said process.

Amino-substituted esters of sulfuric acid and amine salts thereof are known in the prior art as textile assistants, surface-active agents, detergents, and the like. In Ulrich et al. U.S. Patent 2,063,963, processes are described for the production of amino-substituted esters of sulfuric acid by reaction of hydroxyalkyl- or hydroxyaryl-amines with a large excess of concentrated sulfuric acid, oleum, sulfur trioxide, or chlorosulfonic acid at about room temperature. In the copending patent application of Donald L. Klass and John D. King, Serial No. 129,488, filed May 4, 1961, a process is described for the preparation of amino-substituted sulfate esters and amine salts thereof by reaction of ethylene sulfate (or alkyl or aryl derivatives thereof) with a primary or secondary aromatic amine in solution in certain inert solvents. The acylamido-substituted esters of sulfuric acid are believed to be unreported in the prior art and are produced in accordance with the novel process which is described hereinafter.

It is therefore one object of this invention to provide a new and improved process for the preparation of acylamido-substituted esters.

Another object of this invention is to provide an improved process for the preparation of acylamido-substituted sulfate esters from ethylene sulfate and its derivatives.

A further object of this invention is to provide a novel reaction product of cyclic sulfate esters and acyl amides.

A feature of this invention is the provision of a process in which ethylene sulfate (or alkyl or aryl derivatives thereof) is reacted with an acyl amide to produce an acylamido-substituted sulfate ester.

Another feature of this invention is the provision of a process in which ethylene sulfate (alkyl or aryl derivatives thereof) is reacted with an acyl amide in solution to produce as a reaction product an acylamido-substituted sulfate ester.

Still another feature of this invention is the provision of a novel class of reaction products, viz. acylamido-substituted sulfate esters.

Other objects and features of this invention will become apparent from time to time throughout the specifications and claims as hereinafter related.

This invention comprises a novel class of reaction products, viz., acylamido-substituted sulfate esters, and a novel process of preparing such a product. In my process, ethylene sulfate, or an alkyl or aryl derivative thereof, is reacted with an acyl amide. The reaction is carried out with mild heating and is preferably carried out under reflux conditions, although temperatures in the range of from about room temperature to the reflux temperature of the reaction mixture can be used. While the reaction will take place by simple mixing and heating of the reactants, it is preferred to carry out the reaction in solution. When the reaction is carried out by refluxing a solution of the reactants, the product is obtained either as a precipitate (usually resinous in form) from the solution or by evaporation of the solvent.

In carrying out the process of this invention, it is preferred to use an inert solvent in which both ethylene sulfate (or an alkyl or aryl derivative thereof) and the reactant acyl amide are soluble, but in which the product is insoluble. An inert solvent is defined as one which is unreactive toward either of the reactants or the reaction product. Inert solvents which can be used in this process are characterized by low hydrogen-bonding ability and a solubility parameter in range from about 9.3–10.6. Solubility parameter is a term developed by Hildebrand and discussed in detail in Hildebrand and Scott, Solubility of Non-Electrolytes, 3rd edition, Reinhold Publishing Corp. (1949). The use of the solubility parameter in prediction of solubility characteristics of various solvents is developed by Burrell in Solubility Parameters for Film Formers, Official Digest, 27, 727–758 (1955). Solvents which fall in the above range of solubility parameter and hydrogen-bonding ability and which are inert toward the reactants include the following: chloroform, carbon disulfide, pentachloroethane, chlorobenzene, tetrahydronaphthalene, 1,1,2-trichloroethane, dichloroethylether, ethylene dichloride, o-dichlorobenzene, nitrobenzene, 1,2-dibromoethane, dioxane, and α-bromonaphthalene. Additionally, mixtures of solvents can be used which have low hydrogen-bonding ability and a solubility parameter in the aforementioned range, even though the individual solvents of the mixture are not solvents for the reactants in this process. For example, neither carbon tetrachloride nor methylene iodide is a solvent which can be used in this reaction, but a mixture of equal parts by volume of these solvents can be used in this process. Similarly, a mixture of dibromoethane and chloroform is superior as a solvent to either of these solvents alone when used in this process.

I have found that my process functions satisfactorily at the reflux temperature of the reaction mixture although temperatures in the range from about room temperature to the reflux temperature can be used. At lower temperatures the reaction requires a longer period of time, while the reaction is fairly rapid at reflux temperature of the mixture. Under these conditions, I have found that when ethylene sulfate, or alkyl or aryl derivatives of ethylene sulfate, and an acyl amide are mixed and allowed to react, the reaction goes to completion within a few hours. When the cyclic sulfate and the acyl amide are mixed without a solvent and heated, the product is formed directly and only the separation of unreacted materials is required. In some cases, it is desirable to carry the reaction out in solution, preferably under reflux conditions, with the result that the solvent must also be removed from the reaction products. In general, it is preferred to carry out the reaction using essentially equimolar proportions of the reactants. It should be noted, however, that either reactant can be used in excess, which merely requires the separation of unreacted material from the reaction product. While the reaction product has not been completely characterized it is believed that the reaction proceeds in accordance with the equation:

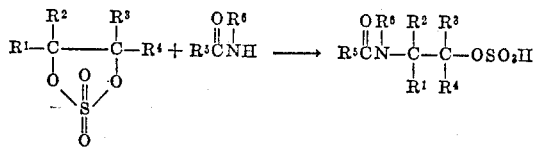

where $R^1$, $R^2$, $R^3$, $R^4$ are hydrogen, aryl, or alkyl radicals, including bridging cyclic radicals, e.g., methyl, ethyl, propyl, butyl, hexyl, decyl, octadecyl, cyclohexyl, phenyl, naphthyl, anthracyl, benzyl, allyl, oleoyl, etc., $R^5$ is an alkyl or aryl radical, such as methyl, ethyl, propyl, butyl, hexyl, decyl, octadecyl, cyclohexyl, phenyl, benzyl, naphthyl, anthracyl, allyl, hexadecenyl, octadecenyl, etc., and R⁶ is hydrogen or an alkyl or aryl radical as previously defined. Thus the R groups are either hydrogen or hydrocarbon groups. Conventional analysis and infra-red analysis indicates that the product which is obtained is probably that shown in the above equation, but the resinous characteristic of the reaction product indicates the possibility that the product may be of a condensed or polymerized form or in some cases may be a simple addition product of the two reactants.

In carrying out this process, the ethylene sulfate and its derivatives are prepared by reaction of ethylene oxide or derivatives of ethylene oxide by with suitable sulfur trioxide complex, e.g., sulfur trioxide-dioxane. For example, propylene oxide can be reacted with dioxane-sulfur trioxide complex to produce propylene sulfate. Butylene sulfate can similarly be prepared from 1,2-buteneoxide. Aryl derivatives of ethylene oxide can be prepared by similar reactions, e.g., styrene oxide reacts with sulfur trioxide-dioxane complex to produce styrene sulfate. Sulfates of cyclic compounds can similarly be prepared by reaction of cycloalkene oxides such as cyclohexene oxide with a sulfur trioxide complex. The sulfate esters which are produced in this manner, and which are used as reactants in this process, include ethylene sulfate and derivatives thereof of the formula:

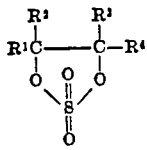

where, $R^1$, $R^2$, $R^3$, and $R^4$ are hydrogen, aryl, or alkyl radicals (including derivatives thereof which contain inert substituents), including bridging cyclic radicals, e.g., methyl, ethyl, propyl, butyl, hexyl, decyl, octadecyl, cyclohexyl, phenyl, naphthyl, anthracyl, benzyl, allyl, oleoyl, etc.

Acyl amides which can be used in this reaction include compounds of the formula:

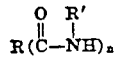

where R is a hydrocarbon radical and R′ is hydrogen or a hydrocarbon radical, and $n$ is 1 or 2. Among the various acyl amides which can be used in this process are acetamide, propanamide, butanamide, decanamide, stearylamide, palmitylamide, acrylamide, benzamide, oxamide, suberamide, sebacamide, etc.

The following non-limiting examples are illustrative of the scope of this invention.

EXAMPLE I

Sulfur trioxide (1 g. mol.), 80.1 g., was added slowly to dioxane (1 g. mol.), 80.1 g., in 150 ml. of ethylene dichloride with stirring and cooling. Propylene oxide (1 g. mol.), 58.1 g., was then added dropwise to the reaction mixture, with stirring and cooling, to give a clear, light yellow solution of propylene sulfate. Acetamide, 11.5 g. (0.2 g. mol.), was then added to 100 ml. of the propylene sulfate solution, and the mixture was refluxed for 4 hours. Finally, the ethylene dichloride solvent was removed under vacuum, leaving as a product a dark-amber viscous oil. The reaction product which was obtained had a distinct odor substantially the same as the odor of hot buttered popcorn. The product analyzed as follows: C, 34.9%; H, 7.0%; N, 5.6%; S, 11.7%. This analysis corresponds roughly to the analysis of the compound,

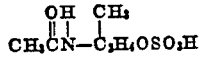

The product was further subjected to infra-red analysis which confirmed the presence of bonded sulfate, as well as carbonyl and carbon-nitrogen bonds. The product appeared to be resinous in nature and therefore it is uncertain as to whether the product is a simple acylamido-substituted ester or a condensed or polymerized form thereof.

In another experiment, the reactions described above were repeated and the crude reaction mixture was diluted with 100 ml. of chloroform which resulted in the precipitation of the reaction product as a dark-amber, viscous oil. This product was separated, washed with chloroform, and purified by drying under vacuum. The product was insoluble in chloroform and ether, and soluble in water and methanol. Aqueous solutions were acidic and gave a precipitate of barium sulfate when treated with barium chloride solution. Infra-red analysis confirmed the presence of bonded sulfate, carbonyl, and carbon-nitrogen bonds. As in the previous experiment, the product had a distinct odor of hot buttered popcorn and appeared to be somewhat resinous in nature.

EXAMPLE II

In another experiment, equimolar portions of propylene oxide and acetamide were heated under reflux conditions. This reaction was carried out to establish that the cyclic sulfate (in Example I) was not decomposing back to the oxide and then reacting with the acid. No reaction products were obtained after refluxing for one hour over a steam bath. Only the starting materials were isolated from the reaction mixture.

EXAMPLE III

A 1-mol. portion of dioxane is dissolved in 100 ml. of ethylene dichloride and treated with 1 mol. of sulfur trioxide to form a slurry of dioxane-sulfur trioxide complex. One mol. of ethylene oxide gas is then bubbled into the slurry over a period of about 1 hour 40 minutes to form a mixture containing ethylene sulfate. Then, the mixture is mixed with an additional 100 ml. of ethylenedichloride containing 1 mol. of methylformamide. The mixture is refluxed for a period of 4 hours, after which time the solvent is removed under vacuum. A resinous reaction product containing methylformamide and ethylene sulfate combined in a 1:1 mol ratio is recovered. The product of this reaction is probably 2-(N-methylformamido) ethyl acid sulfate.

EXAMPLE IV

When this process is carried out using other solvents, other acyl amides, and other derivatives of ethylene sulfate, similar products are obtained. When ethylene sulfate (or a derivative thereof) and an acyl amide are dissolved in an inert solvent and heated to a temperature in the range from about room temperature to the reflux temperature of the solution, a 1:1 reaction product is obtained after a relatively short reaction time, viz., about 4 hours. In Tabe I there are set forth in tabular form the conditions and solvents for reactions of various acyl amides and alkylene sulfates to produce the 1:1 reaction products of this invention.

Table I

| Amide | Sulfate | Solvent | Reaction Temp., °C. |
|---|---|---|---|
| Propanamide | 1,2-butylene sulfate | None | 80 |
| Stearylamide | Ethylene sulfate | 1,2-dibromoethane | 90 |
| Benzamide | do | Nitrobenzene | 75 |
| Acrylamide | do | Ethylene dichloride | 30 |
| Acetamide | Styrene sulfate | do | 75 |
| Oxamide | Propylene sulfate | do | 75 |
| Succinamide | do | do | 75 |
| Sebacamide | do | Chloroform | 61 |

From the foregoing examples it is seen that this process is generally applicable to the reaction of ethylene sulfate, or derivatives thereof containing hydrocarbon substituents having no reactive substituents thereon, with acyl amides (either mono-functional or di-functional) to produce a novel class of reaction products. The reaction can be carried out by simple admixture and moderate heating of the alkylene sulfate and acyl amide, but is preferably carried out in solution in an inert mutual solvent. Where a solvent is used, it is preferably one having low hydrogen-bonding ability and a solubility parameter in range of from about 9.3 to 10.6. The reaction is preferably carried out using equimolar portions of the reactants, but an excess of either reactant can be used, in which case the excess reactant must be separated from the reaction product. The reaction product which is obtained can be purified by evaporation or stripping of the solvent and/or unreacted materials, or by precipitation by dilution of the reaction mixture with a solvent in which the reaction product is highly insoluble. A preferred method of carrying out this process is to react the amide and sulfate reactants in a mutual solvent in which each of the reactants is soluble, but in which the reaction product is insoluble. In such a case, the product is obtained as a precipitate. The reaction products which are obtained in accordance with this invention are useful for a variety of purposes. These reaction products can be used as odorants (the reaction product of acetamide and propylene sulfate is useful in providing a synthetic odor corresponding to that of hot buttered popcorn), and are useful as organic intermediates in the production of surfactant materials. The salts of these reaction products have surfactant properties, and where the product is derived from an acyl amide or a sulfate reactant having a long aliphatic side chain (e.g. $C_{12}$ or longer), the product has detergent properties.

While I have described my invention fully and completely with special emphasis upon several preferred embodiments, I wish it to be understood that within the scope of the appended claims this invention may be practiced otherwise than as specifically described herein.

The embodiments of the invention in which an exclusive property or privilege is claimed are as follows:

1. A method of preparing carboxamido-substituted sulfate esters comprising reacting an alkylene sulfate of the formula

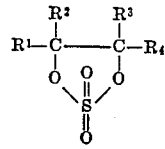

in which $R^1$, $R^2$, $R^3$ and $R^4$ are from the group consisting of hydrogen, alkyl radicals, aryl radicals and members of bridging carbocyclic radicals, with a carboxamide of the formula

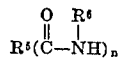

in which $R_5$ is a hydrocarbon radical, $R_6$ is from the group consisting of H and hydrocarbon radicals and $n$ is an integer from the group consisting of 1 and 2, at a temperature in the range of from about room temperature to the reflux temperature of the reaction mixture.

2. A method in accordance with claim 1 in which the reactants are mixed in a 1:1 mol ratio.

3. A method in accordance with claim 1 in which the reaction is carried out in an inert solvent of low hydrogen-bonding power and a solubility parameter of 9.3 to 10.6.

4. A method in accordance with claim 3 in which the solution is refluxed until reaction is complete.

5. A method in accordance with claim 4 in which alkylene sulfate is ethylene sulfate.

6. A method in accordance with claim 4 in which alkylene sulfate is propylene sulfate.

7. A method in accordance with claim 4 in which alkylene sulfate is butylene sulfate.

8. A method in accordance with claim 4 in which the acyl amide is acetamide.

9. A method in accordance with claim 4 in which the acyl amide is stearylamide.

10. A method in accordance with claim 4 in which the acyl amide is benzamide.

11. A method in accordance with claim 4 in which acetamide and propylene sulfate are refluxed in ethylene dichloride.

References Cited by the Examiner
UNITED STATES PATENTS 1,932,180  10/33  Guenther et al. _____ 260—457
2,551,125   5/51  Henry _____ 260—457

CHARLES B. PARKER, *Primary Examiner.*

D. D. HORWITZ, JOSEPH P. BRUST, *Examiners.*